(12) United States Patent
Sugie et al.

(10) Patent No.: US 8,091,003 B2
(45) Date of Patent: Jan. 3, 2012

(54) POSITION DETECTION ERROR CORRECTING METHOD

(75) Inventors: Hiroshi Sugie, Tokyo (JP); Hirokazu Sakuma, Tokyo (JP); Takashi Okamuro, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1003 days.

(21) Appl. No.: 11/997,947

(22) PCT Filed: Nov. 9, 2006

(86) PCT No.: PCT/JP2006/322341
§ 371 (c)(1),
(2), (4) Date: Feb. 5, 2008

(87) PCT Pub. No.: WO2007/060840
PCT Pub. Date: May 31, 2007

(65) Prior Publication Data
US 2009/0259918 A1    Oct. 15, 2009

(30) Foreign Application Priority Data

Nov. 28, 2005 (JP) .................................. 2005-341834

(51) Int. Cl.
*G01B 21/00* (2006.01)
(52) U.S. Cl. ........................................ 714/746; 702/94
(58) Field of Classification Search .................. 714/746; 73/1.79; 702/94
See application file for complete search history.

(56) References Cited

U.S. PATENT DOCUMENTS

| | | | | |
|---|---|---|---|---|
| 4,490,914 A | * | 1/1985 | Spies | ............................. 33/700 |
| 5,305,241 A | * | 4/1994 | Hayashi et al. | ................. 702/94 |
| 6,301,550 B1 | * | 10/2001 | Okamoto et al. | ............. 702/167 |
| 6,304,825 B1 | * | 10/2001 | Nowak et al. | .................... 702/94 |
| 6,317,991 B1 | * | 11/2001 | Rinn | ............................... 33/1 M |
| 6,649,925 B2 | * | 11/2003 | Talmi | .......................... 250/559.1 |
| 6,664,752 B2 | * | 12/2003 | Kanayama et al. | ........... 318/639 |
| 7,047,145 B2 | * | 5/2006 | Ishizuka et al. | ................. 702/94 |
| 7,251,575 B2 | * | 7/2007 | Hiller | ............................... 702/94 |
| 7,411,530 B2 | * | 8/2008 | Kopken | ......................... 341/115 |
| 7,496,462 B2 | * | 2/2009 | Murokita et al. | ............... 702/90 |

FOREIGN PATENT DOCUMENTS

| JP | 60 79220 | 5/1985 |
|---|---|---|
| JP | 61 149822 | 7/1986 |
| JP | 2543245 | 7/1996 |
| JP | 2001 91237 | 4/2001 |

* cited by examiner

*Primary Examiner* — Stephen Baker
(74) *Attorney, Agent, or Firm* — Oblon, Spivak, McClelland, Maier & Neustadt, L.L.P.

(57) ABSTRACT

A position detection error correcting method that corrects position detection errors using a limited storage capacity, by calculating position detection error correction values by four simple arithmetic operations at startup to reduce a startup time delay and consumption of a storage capacity even when a portion containing steep error variations exists. Detection error correction values of a position detector are expressed by a correction function using a periodic function, and correction parameters of the correction values are stored in advance in a non-volatile memory. At startup, these correction parameters are read out, and a position detection error correction value corresponding to each detected position is calculated and stored in a random access memory. The output position detection error correction value detector corresponding to each detected position is read out from the random access memory and a corrected detected position value corrected for the detected position value error is calculated.

6 Claims, 9 Drawing Sheets

(a) IN CASE OF UNIFORM ERRORS (R=0)

(b) IN CASE OF NONUNIFORM ERRORS (R=3)

POSITION DETECTION ERROR CORRECTING METHOD

TECHNICAL FIELD

The present invention relates to a position detection error correcting method for correcting detection errors of a position detector for detecting rotational or linear positions.

BACKGROUND ART

A conventional position detection error correcting apparatus corrects detected positions by storing in advance individual frequency components obtained by expanding errors in a Fourier series in a nonvolatile memory, inversely Fourier-transforming the individual frequency components at startup and recording error correction values in a random access memory, and reading out an error correction value for each detected position (refer to Patent Document 1, for example).
Patent Document 1: Japanese Published Patent No. 2543245 (lines 2-14 in right column on page 2, FIG. 1)

DISCLOSURE OF THE INVENTION

Problems to be Solved by the Invention

In this kind of position detection error correcting apparatus, it is necessary to carry out trigonometric function operations a plurality times to perform inverse Fourier transform at startup, so that there has been a problem that processing time becomes extremely long, causing a delay in startup. An approach to relieving work load in the trigonometric function operations by approximating the trigonometric function operations using a table stored in a random access memory in advance, for example, utilizes the random access memory for performing the trigonometric function operations. Thus, there has been a problem in this approach that the capacity of the random access memory decreases by a corresponding amount, resulting in an inability to make corrections with high accuracy.

Additionally, there has been a problem that it is difficult to make high-accuracy corrections in an area where rapid changes in error occur, because ranges of detected positions to be corrected with one position detection error correction value are uniformly distributed throughout an entire position detection range.

The present invention has been made to solve the aforementioned problems. Accordingly, it is an object of the invention to obtain a position detection error correcting method which makes it possible to prevent a delay in startup time and consumption of the capacity of storage means and perform high-accuracy corrections with a limited storage capacity even when there is an area where rapid changes in error is contained by calculating position detection error correction values using four simple arithmetic operations at startup.

Means for Solving the Problems

A position detection error correcting method according to the present invention includes a first step of storing beforehand in first storage means a correction parameter set specifying one of a plurality of correction functions each of which expresses detection error correction values of a position detector, the correction functions corresponding to a series of periodic functions, a second step of reading out the correction parameter set from the first storage means, calculating the detection error correction values corresponding to detected positions and storing the same in second storage means, and a third step of reading out the detection error correction values corresponding to detected position values output from the position detector from the second storage means and calculating corrected detected position values corrected for errors in the detected positions, wherein, expressing the detected positions by θ, the correction function C(θ) is expressed by equation (1) below in which a periodic function G(θ) is a power function of θ:

[Mathematical Expression 1]

$$C(\theta) = \sum_n \{A_n \cdot G(n\theta + B_n)\} + D \quad \text{(Eq. 1)}$$

where
n: order
An: amplitude component of the correction parameter,
Bn: phase component of the correction parameter, and
D: offset of the correction parameter.

Advantageous Effects of the Invention

In this invention, the detection error correction values expressed by the periodic function G(θ) which is a power function of detected positions θ can be reproduced by using the correction parameter stored in the first storage means by four basic arithmetic operations as described above, so that it becomes possible to start up a position detection error correcting apparatus in a shorter time compared to a conventional arrangement using trigonometric functions. Also, since the position detection error correcting apparatus uses a smaller amount of the capacity of the second storage means compared to an arrangement which refers to a table of numerical values instead of using the trigonometric functions, it becomes possible to assign a larger amount of the capacity of the second storage means for storing the position detection error correction values, thus producing an advantage that highly accurate corrections can be realized.

DESCRIPTION OF THE SYMBOLS

Figure 1:
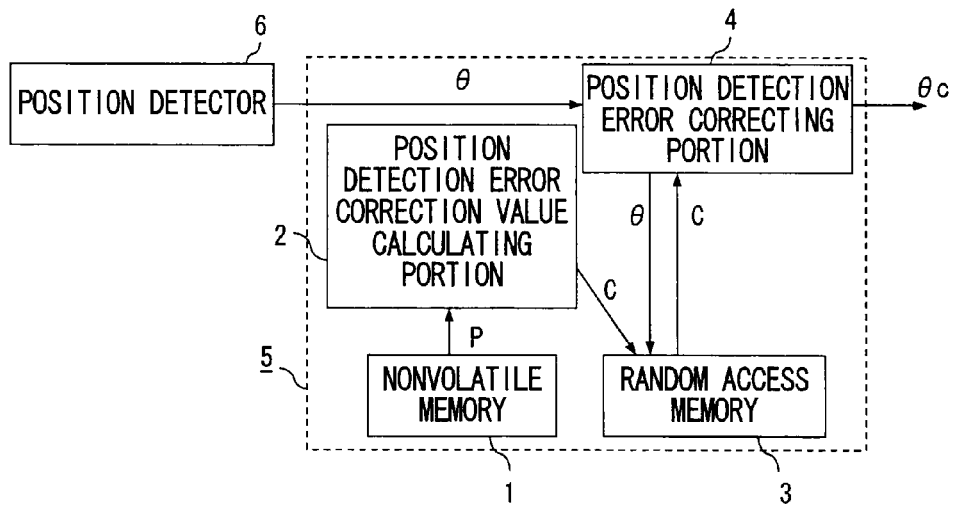
FIG. 1 is a block diagram showing the configuration of a position detection error correcting apparatus which realizes a position detection error correcting method according to a first embodiment of the present invention.

1 Nonvolatile memory
2 Position detection error correction value calculating portion
3 Random access memory
4 Position detection error correcting portion
5 Position detection error correcting apparatus
6 Position detector

BEST MODES FOR CARRYING OUT THE INVENTION

First Embodiment

FIG. 1 is a block diagram showing the configuration of a position detection error correcting apparatus 5 which realizes a position detection error correcting method according to a first embodiment of the present invention.

A nonvolatile memory 1 serving as first storage means stores in advance a correction parameter set P which specifies one of a plurality of correction functions each of which expresses position detection errors, the correction functions corresponding to a series of periodic functions. This correction parameter set P is read out and output to a position detection error correction value calculating portion 2 at startup.

A procedure for calculating the correction parameter set P will be later described in detail.

The position detection error correction value calculating portion 2 calculates position detection error correction values C(θ) which constitute a correction function corresponding to detected position values θ from the correction parameters P(An, Bn, D) by using equation (1) and outputs the position detection error correction values C(θ) to a random access memory 3 serving as second storage means.

A procedure for calculating the detection error correction values C(θ) by using the correction parameter set P will be later described in detail.

Here, correction parameters An, Bn and D are an amplitude component of each periodic function G, a phase component and an offset of the same, respectively. Also, n is the order of individual terms constituting the series of periodic functions G(θ).

[Mathematical Expression 2]

$$C(\theta) = \sum_n \{A_n \cdot G(n\theta + B_n)\} + D \quad (\text{Eq. 1})$$

The periodic function G(θ) is expressed as a power function of θ, that is, a power of $\theta^m$ (where m is a positive integer).

Figure 2:
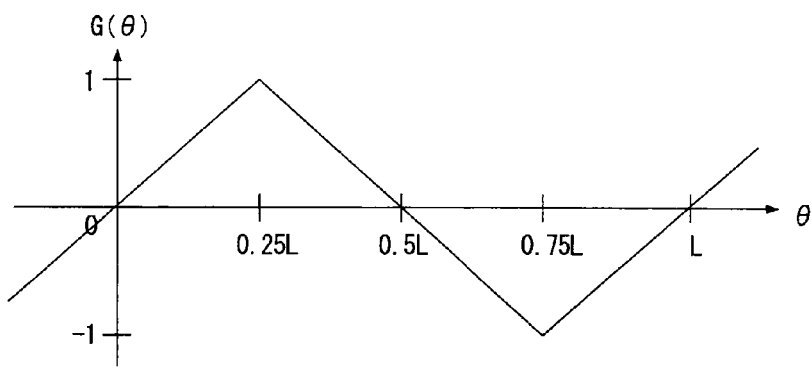
FIG. 2 is a graph depicting a periodic function G(θ) expressed by a linear function of detected position values θ.

Shown by equation (2) and illustrated in FIG. 2 is a case in which the periodic function G(θ) is expressed by a linear function of θ. In this case, the periodic function G(θ) shows a sawtooth wave pattern as illustrated.

[Mathematical Expression 3]

$$G(\theta) = \begin{cases} 4\theta m/L & (0 \le \theta m \le 0.25L) \\ -4\theta m/L + 2 & (0.25L < \theta m \le 0.75L) \\ 4\theta m/L - 4 & (0.75L < \theta m < L) \end{cases} \quad (\text{Eq. 2})$$

where θm is the remainder left when θ divided by a fundamental period L. In a case where a position detector 6 is such a device as a rotary encoder for detecting rotational positions, for example, position detection errors occur in an interval of one rotation, so that a detecting range of one rotation is regarded as the fundamental period L. In a case where the position detector 6 is of a type for detecting linear positions, an entire position detecting range is regarded as the fundamental period L.

As will be understood from a principle of detection of the position detector later discussed with reference to FIG. 3, the fundamental period L is expressed generally by a power of 2. Therefore, the remainder θm left when θ is divided by L can be calculated by performing a so-called AND operation on bits and 4 θm/L can be calculated by a so-called bit shift operation in a short time without the need to refer to a table.

Upon completion of startup, the position detection error correction value C(θ) relevant to the detected position value θ is read out from the random access memory 3 and a corrected detected position value θc calculated by equation (3) is output each time the detected position value θ is input from the position detector 6 into a position detection error correcting portion 4.

[Mathematical Expression 4]

$$\theta c = \theta - C(\theta) \quad (\text{Eq. 3})$$

While the position detection error correcting apparatus 5 is indicated as an independent device in FIG. 1, it is possible to provide the position detection error correcting apparatus 5 inside the position detector 6 or inside an unillustrated controller or servo amplifier which receives the corrected detected position value θc.

Figure 3:
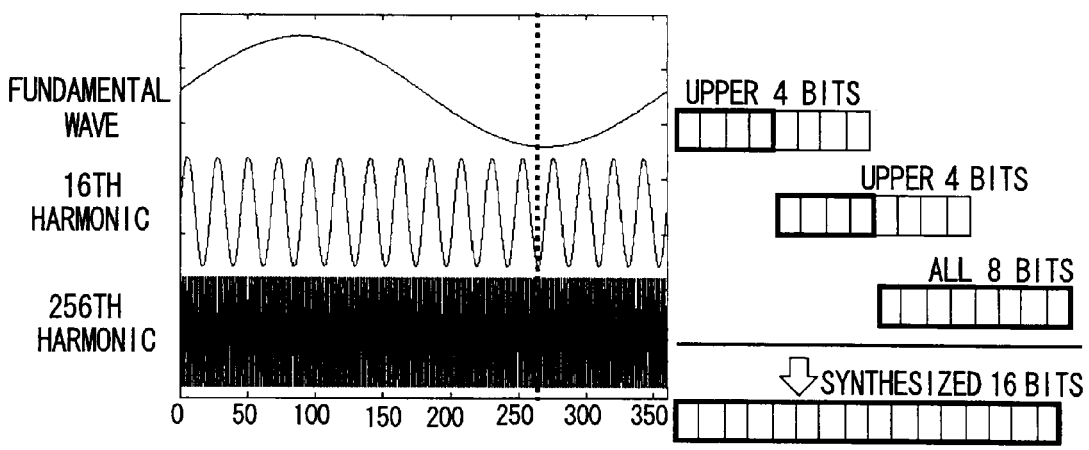
FIG. 3 is a diagram for explaining a method of calculating the detected position values by synthesizing a sine wave signal from which positions are detected with bits.
Figure 4:
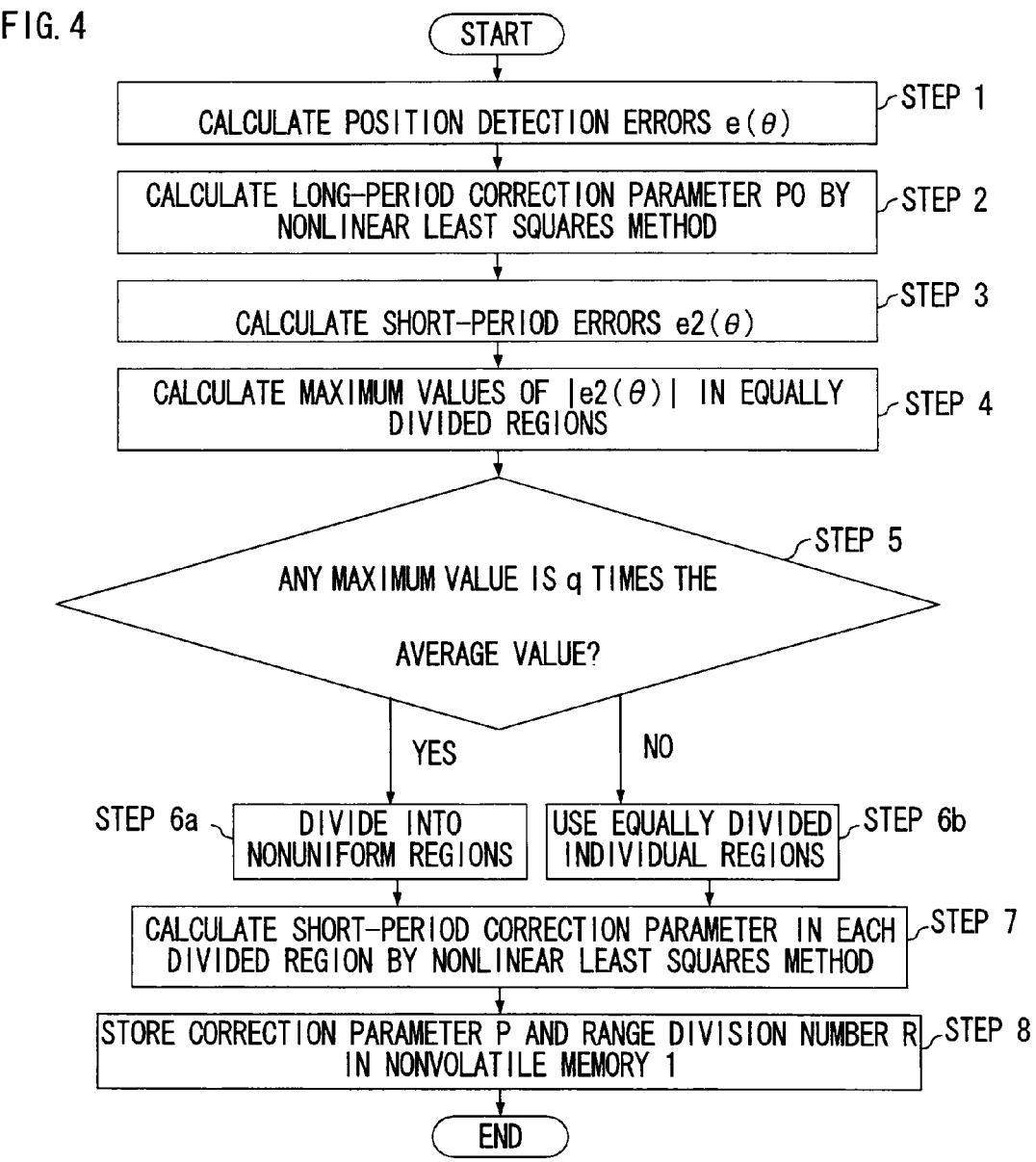
FIG. 4 is a flowchart for explaining a method of calculating a correction parameter P to be stored in advance in a nonvolatile memory 1.

Explained next with reference to a flowchart of FIG. 4 is a method of calculating the correction parameter P to be stored in advance in the nonvolatile memory 1. Explained here is an example in which errors of a position detector for detecting absolute positions are corrected by use of three pairs of 2-phase sine wave signals as shown in FIG. 3. FIG. 3 shows one of 2-phase sine wave signals only. The other of the 2-phase sine wave signals is a signal offset in phase by 90 degrees. While there are optical and magnetic types in this kind of position detector, a description of the same is omitted as its structure and operating principle are conventionally known.

Here, as shown in FIG. 3, detected position values are individually calculated with 8-bit resolution from 2-phase sine wave signals made up of a fundamental wave having the fundamental period L, a 16th harmonic thereof and a 256th harmonic having a short period L1 by inverse arc tangent operation, and a 16-bit detected position value obtained by synthesizing upper 4 bits taken from the fundamental wave, upper 4 bits taken from the 16th harmonic and all the 8 bits taken from the 256th harmonic is output.

First, a reference position detector more accurate than the position detector 6 is prepared and position detection errors e(θ) which are position detection error data showing a relationship between errors and detected position values θ of the position detector 6 are measured regarding detected values of the reference position detector as true position values (Step 1). Next, a correction parameter P0(An, Bn, D1) having a relatively long period which minimizes an evaluation function E shown in equation (4) is calculated by using such a nonlinear least squares method as the Levenberg-Marquardt method (Step 2).

Specifically, the fundamental period L is divided into a plurality of equally spaced regions having a relatively long period. For example, the fundamental period L is divided into 16 equally spaced regions, and the correction parameter for the long period is calculated based on the position detection errors e(θ) extracted from the individual regions having the long period.

[Mathematical Expression 5]

$$E = \sum_{k=1}^{K}\left[e(\theta_k) - \sum_{n=1}^{N}\{A_n \cdot G(n\theta_k + B_n)\} - D_1\right]^2 \quad \text{(Eq. 4)}$$

where θk represents a kth measured value among the detected position values θ and K represents the number of all measurement data. Also, the degree n of the series is defined as n=1, 2, ..., 8 (N=8), for example.

Next, position detection error correction values for the entire fundamental period L are calculated by using the long-period correction parameter thus calculated, and short-period errors e2(θ) in the equally divided individual regions are calculated by equation (5) using the correction values and the position detection errors e(θ) (Step 3).

[Mathematical Expression 6]

$$e_2(\theta) = e(\theta) - \left[\sum_{n=1}^{K}\{A_n \cdot G(n\theta + B_n)\} + D_1\right] \quad \text{(Eq. 5)}$$

Next, a maximum value of absolute values of the short-period errors e2(θ) in each of the equally divided regions is obtained (Step 4). Then, a maximum value of the maximum values in the individual regions and an average value thereof obtained by averaging the maximum values in the individual regions throughout the entire range are compared to judge whether the maximum value of the maximum values exceeds q times (e.g., twice) the average value of the maximum values (Step 5). If the former exceeds q times the latter (Yes in Step 5), it is judged that there is a large local error and the fundamental period L is divided into unequal regions prepared in advance (Step 6a). If the maximum value of the maximum values is equal to or smaller than q times the average value of the maximum values (No in Step 5), it is judged that the errors occur uniformly, and the already equally divided individual regions are used (Step 6b).

Figure 5:
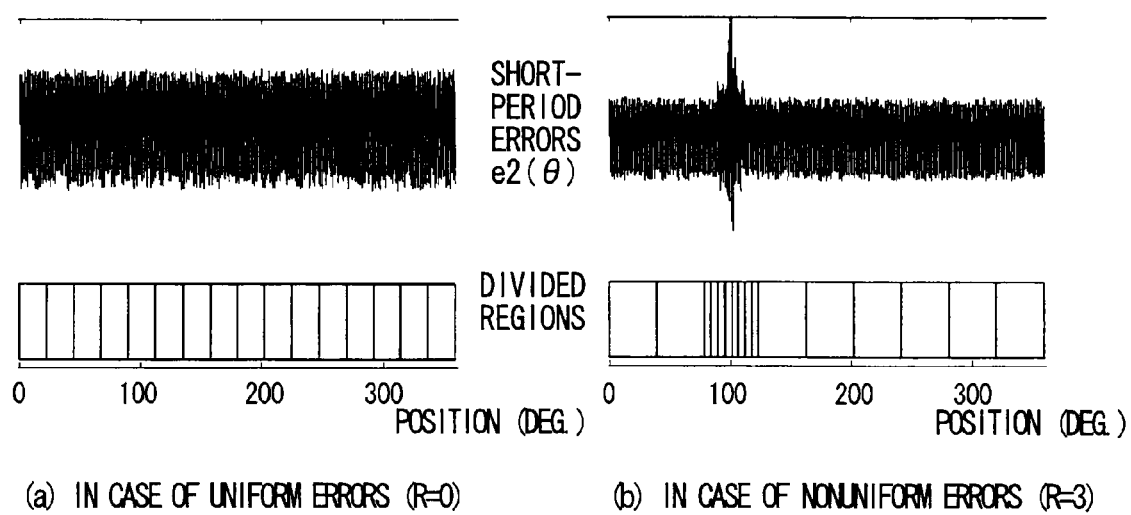
FIG. 5 is a diagram showing divided regions corresponding to short-period errors e2(θ)
Figure 8:
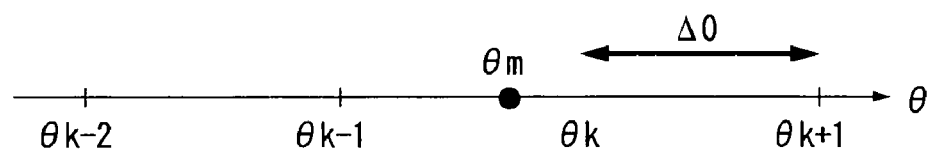
FIG. 8 is a schematic diagram for explaining a method of determining θk nearest to arbitrary detected positions θm by using a floor function.

FIG. 5 shows an example of how the fundamental period L is divided. In a case where the short-period errors e2(θ) occur uniformly as show in FIG. 5(a), a 360-degree position detection range is divided into regions of 1/16th of the 360-degree detection range. In a case where the short-period errors e2(θ) are locally large as show in FIG. 5(b), 8 regions of 1/64th of the detection range are provided centering on a position of a maximum error and a remaining part of the detection range is divided into 8 regions of 7/64th of the detection range. Here, a range division number R=3 is stored as a region number designating a point where segmentation into small regions begins. When the fundamental period L is equally divided, a range division number R=0 is stored.

Next, a short-period correction parameter Pi(Aij, Bij, Di) which minimizes an evaluation function Ei shown in equation (6) is calculated by using the nonlinear least squares method as in Step 2 (Step 7), in which i is a number designating a divided region, j (e.g., 256, 512, 768, 1024 or the like) is a multiple of the period, and Ki indicates the number of measurement data within the region i.

[Mathematical Expression 7]

$$E = \sum_{k=1}^{Ki}\left[e_2(\theta_k) - \sum_{j}\{A_{ij} \cdot G(j\theta_k + B_{ij})\} - D_i\right]^2 \quad \text{(Eq. 6)}$$

Finally, the long-period correction parameter P0, the short-period correction parameter Pi and the range division number R are stored in the nonvolatile memory 1 (Step 8).

Figure 6:
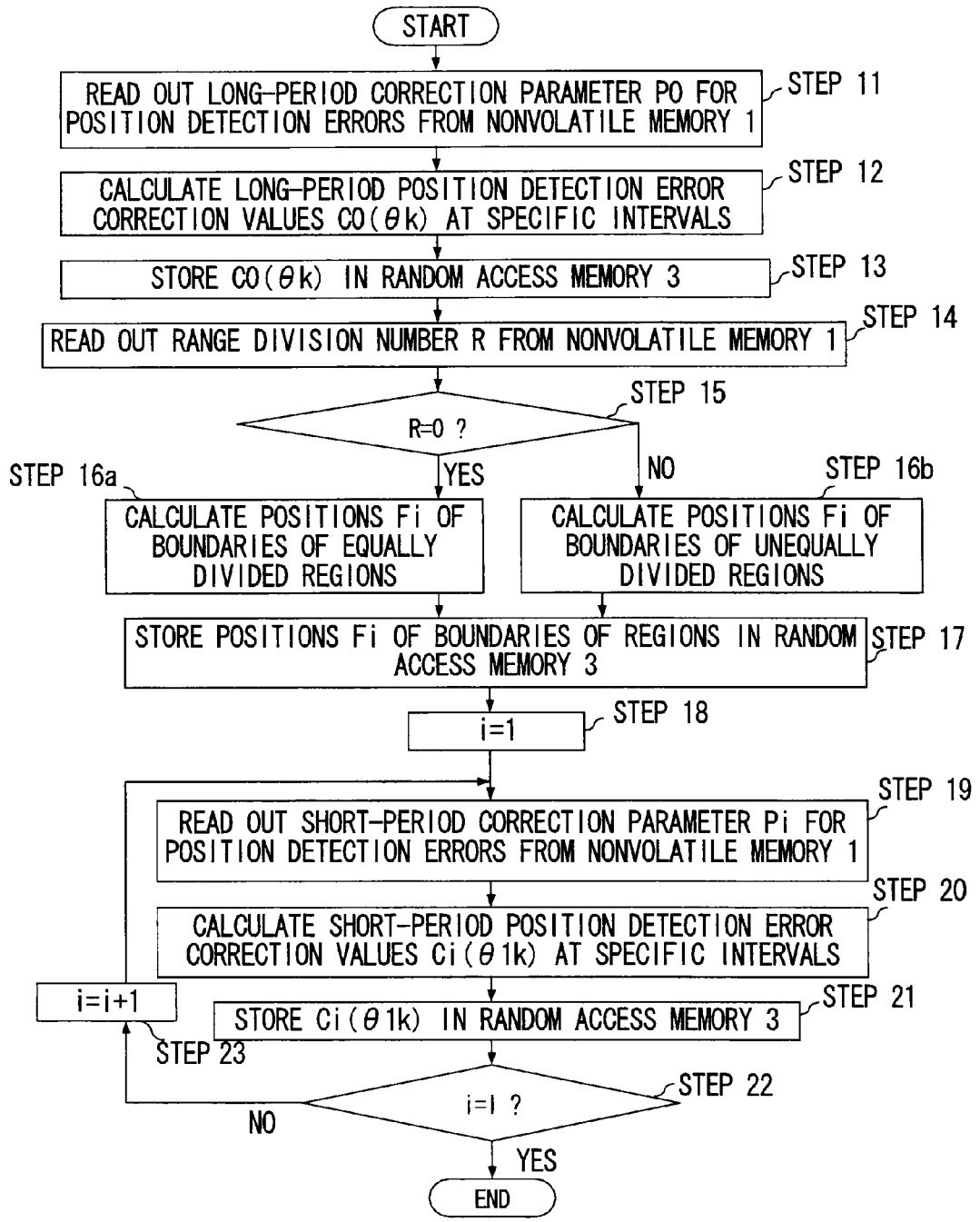
FIG. 6 is a flowchart for explaining how a position detection error correction value calculating portion 2 calculates position detection error correction values generated at startup.

Explained next with reference to a flowchart of FIG. 6 is how the position detection error correction value calculating portion 2 calculates the position detection error correction values C(θ) generated at startup. First, the position detection error correction value calculating portion 2 reads out the long-period correction parameter P0 from the nonvolatile memory 1 (Step 11), calculates long-period position detection error correction values $C_0(\theta k)$ by using equation (7) (Step 12), and stores the same in the random access memory 3 (Step 13).

[Mathematical Expression 8]

$$C_0(\theta k) = \sum_{n=1}^{N}\{A_n \cdot G(n\theta_k + B_n)\} + D_1 \quad \text{(Eq. 7)}$$

where θk indicates representative positions obtained by dividing the position detection range in equal intervals. When preparing long-period position detection error correction values for 128 points by using an angle sensor having a resolution of 16 bits=65536 pulses/rev., for example, the position detection error correction value calculating portion 2 calculates the long-period position detection error correction values at intervals of 65536/128=512 pulses. Next, the position detection error correction value calculating portion 2 reads out the range division number R from the nonvolatile memory 1 (Step 14) and judges whether the range division number R is 0 or not (Step 15). If R=0, the position detection error correction value calculating portion 2 calculates positions Fi of boundaries of equally divided regions by using equation (8) (Step 16a). If R≠0, the position detection error correction value calculating portion 2 calculates positions Fi of boundaries of unequally divided regions by using equation (9) (Step 16b).

[Mathematical Expression 9]

$$(\text{if } R=0) Fi = i \cdot L/I (i=1, \ldots, I) \quad \text{(Eq. 8)}$$

where I is the number of divided regions (e.g., 16).

[Mathematical Expression 10]

(if R≠0)

(if i<R) $Fi = i \cdot L \cdot 7/64$ (else if $i<(R+8))Fi=L\{(R-1)7/64+(i-R+1)/64\}$. (Eq. 9)

(else) $Fi=L\{1/8+(i-8)/64\}$

Here, equation (9) is a formula used for calculating the positions of boundaries of divided regions defined by dividing the detection range into 8 regions of 1/64th of the detection range and 8 regions of 7/64th thereof as shown in FIG. 5(b). In a case where the detection range is divided into regions including a different number or size of unequal regions than this, a relevant calculation formula is prepared correspondingly. The position detection error correction value calculating portion 2 stores the calculated positions Fi of the boundaries of the divided regions in the random access memory 3 (Step 17). Next, the position detection error correction value calculating portion 2 reads out a short-period correction parameter Pi(Ai, Bi, Di) for each of the divided regions from the nonvolatile memory 1 (Step 19), calculates short-period position detection error correction values $Ci(\theta 1k)$ by using equation (10) (Step 20), and stores the same in the random access memory 3 (Step 21).

[Mathematical Expression 11]

$$Ci(\theta 1k) = \sum_j \{A_{ij} \cdot G(j\theta_{1k} + B_{ij})\} + Di \quad \text{(Eq. 10)}$$

where $\theta 1k$ indicates representative positions obtained by dividing the position detection range in equal intervals. When preparing short-period position detection error correction values for 32 points at intervals for short-period 2-phase sine waves 256 times that for the fundamental wave by using the angle sensor having the resolution of 16 bits=65536 pulses/rev., for example, the position detection error correction value calculating portion 2 calculates the short-period position detection error correction values at intervals of 65536/(32*256)=8 pulses.

Figure 7:
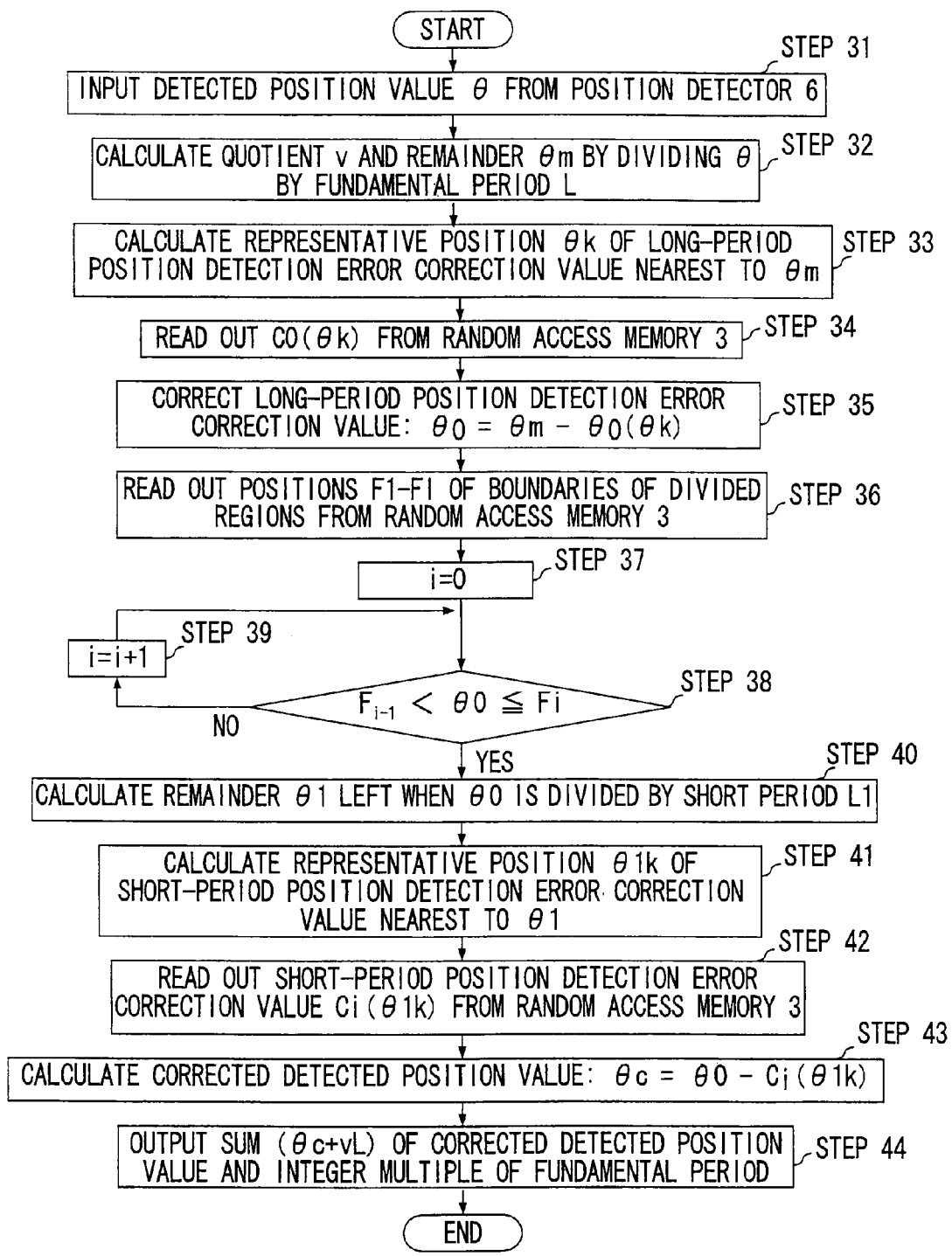
FIG. 7 is a flowchart for explaining how a position detection error correcting portion 4 calculates corrected positions.

Explained next with reference to a flowchart of FIG. 7 is how the position detection error correcting portion 4 calculates corrected positions. First, the detected position value θ is input from the position detector 6 (Step 31) and the position detection error correcting portion 4 calculates a quotient v and a remainder θm by dividing each of the detected position values θ by the fundamental period L (Step 32). Next, the position detection error correcting portion 4 calculates a representative position θk of the long-period position detection error correction value nearest to the remainder θm left when each detected position value θ is divided by the fundamental period L by using equation (11) (Step 33).

[Mathematical Expression 12]

$\theta k = ?_0 \text{floor}\{(\theta m + 0.5?_0)/?_0\}$ (Eq. 11)

where ?0 is the interval from one representative position to the next (e.g., 512 pulses) and "floor" is a function indicating a maximum integer which does not exceed an operand.

Since position detection error correction values C are prepared for positions θk at regular intervals only, equation (11) is used to calculate θk nearest to arbitrary detected positions θm. If ?0=10, θk=0, 10, 20, 30, . . . , θm=17, in FIG. 8, for example, ?0·floor{(θm+0.5·?0)/?0}=10·floor{((17+5)/10}=10·floor(2.2)=20 so that θk=20 nearest to θm=17 is obtained.

If ?0 is a power of 2, the division expressed by the aforementioned equation is possible by a high-speed bit shift operation. Subsequently, the position detection error correcting portion 4 reads out the long-period position detection error correction value $C_0(\theta k)$ corresponding to ƒk from the random access memory 3 (Step 34) and calculates a corrected detected position value $\theta_0$ corrected for the long-period position detection error by subtracting the long-period position detection error correction value $C_0(\theta k)$ from the detected position value θ as shown in equation (12) (Step 35).

[Mathematical Expression 13]

$\theta_0 = \theta m - C_0(\theta k)$ (Eq. 12)

Next, the position detection error correcting portion 4 reads out positions F1-FI of boundaries of divided regions from the random access memory 3 (Step 36) and searches for position Fi of a boundary of divided regions that satisfies inequality (13) (Steps 37-39).

[Mathematical Expression 14]

$F_{i-1} \theta_0 F_i$ (Ineq. 13)

A value i satisfying inequality (13) indicates the divided region to which the corrected detected position value $\theta_0$ corrected for the long-period position detection error corresponds. Next, the position detection error correcting portion 4 calculates a remainder θ1 left when the detected position value $\theta_0$ corrected for the long-period position detection error is divided by the short period L1 (Step 40). In the case of the position detector 6 shown in FIG. 3, the short period L1 is 256 obtained by dividing the fundamental period L (65536) by the frequency 256 of a short-period signal. If the short period L1 is a power of 2, it is possible to calculate the remainder left after division by the short period L1 by a high-speed AND operation. Next, the position detection error correcting portion 4 calculates a representative position θ1k of the short-period position detection error correction value nearest to the remainder θ1 left after division by the short period L1 by using equation (14) (Step 41).

[Mathematical Expression 15]

$\theta 1k = ?_1 \text{floor}\{(\theta_1 + 0.5?_1)/?_1\}$ (Eq. 14)

where ?1 is the interval from one representative position to the next (e.g., 8 pulses) of the short-period position detection error correction value. Next, the position detection error correcting portion 4 reads out the short-period position detection error correction value $Ci(\theta 1k)$ corresponding to the representative position θ1k of the short-period position detection error correction value for the divided region i (Step 42) and calculates the corrected detected position value θc by subtracting the short-period position detection error correction value $Ci(\theta 1k)$ from the detected position value $\theta_0$ corrected for the long-period position detection error as shown in equation (15) (Step 43).

[Mathematical Expression 16]

$$\theta_c = \theta_0 - C_i(\theta_{lk})$$ (Eq. 15)

Finally, the position detection error correcting portion 4 outputs the sum (θc+vL) of the corrected detected position value and an integer multiple of the fundamental period to an external circuit (Step 44).

As thus far described, the position detection error correction value C(θ) is calculated from the correction parameter P read out from the nonvolatile memory 1 by using the four simple arithmetic operations at startup in the first embodiment of the present invention, so that the position detection error correcting apparatus 5 requires a shorter processing time compared to a conventional arrangement using trigonometric functions and can be started up in a short time. Also, since the position detection error correcting apparatus 5 uses a smaller amount of the capacity of the random access memory 3 compared to an arrangement which refers to a table of numerical values instead of using the trigonometric functions, it becomes possible to assign a larger amount of the capacity of the random access memory 3 for storing the position detection error correction values C(θ), thus producing an advantage that highly accurate corrections can be realized.

Also, should there exist a portion where large errors occur in part of the detection range as shown in FIG. 5(b), the position detection error correcting apparatus 5 segments the portion of large errors into small regions and prepares the short-period position detection error correction value $C_i(\theta 1k)$. Therefore, compared to a case where the detection range is equally divided, the position detection error correcting apparatus 5 produces an advantage that corrections are possible with higher accuracy for the limited capacity of the random access memory 3.

Second Embodiment

The foregoing first embodiment employs a method of dividing the detection range into regions for correcting short-period errors, in which the detection range is once equally divided, and if there are large variations in maximum values of errors from one region to another, the detection range is divided again into regions in such a way that a portion of large errors is finely divided and a portion of small errors is coarsely divided. Discussed in a second embodiment is a method of realizing fine region segmentation by smoothly dividing the detection range in a two-step process.

Figure 9:
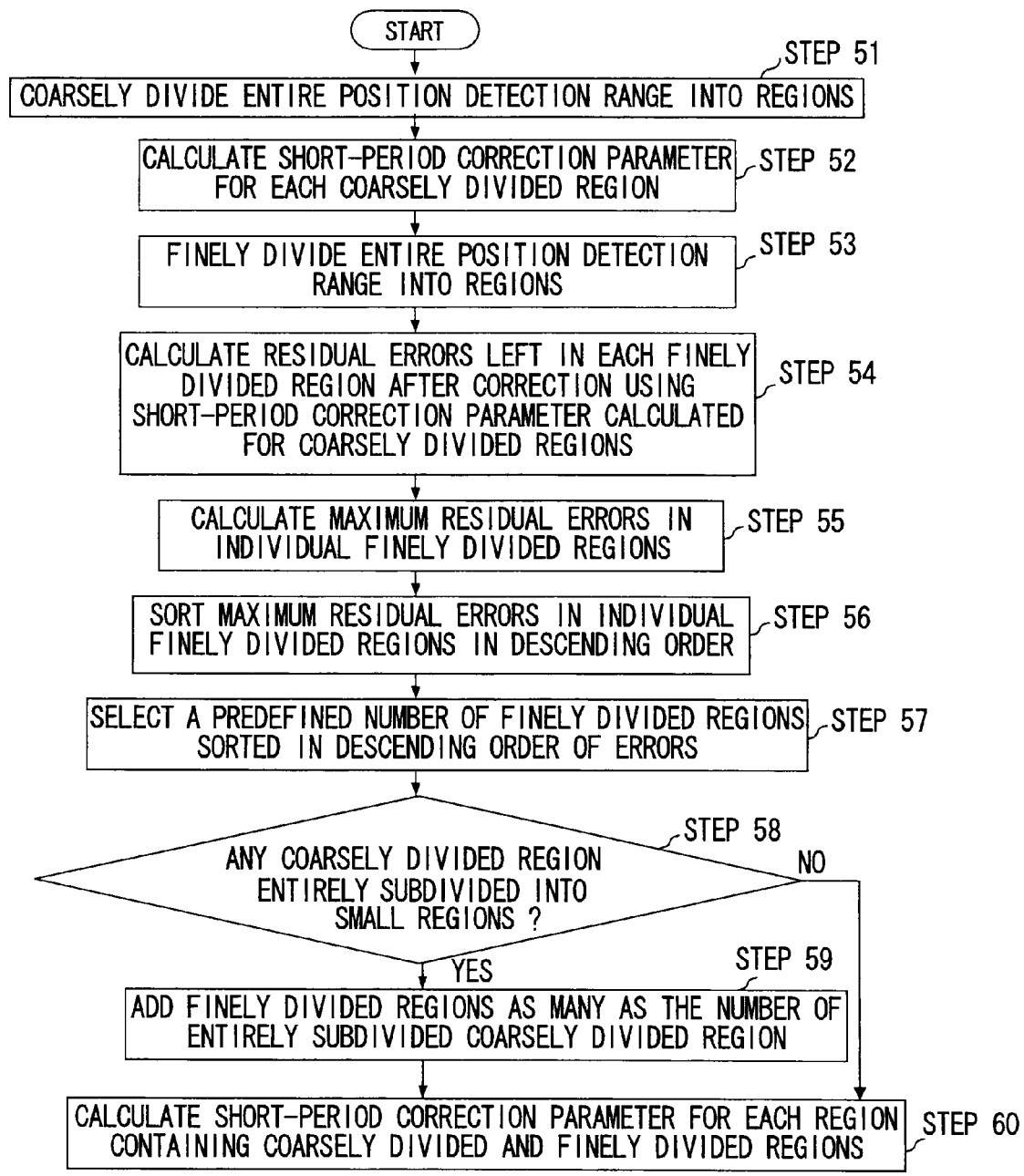
FIG. 9 is a flowchart showing a process of finely dividing a detection range into regions for correcting short-period errors in two steps.
Figure 10:
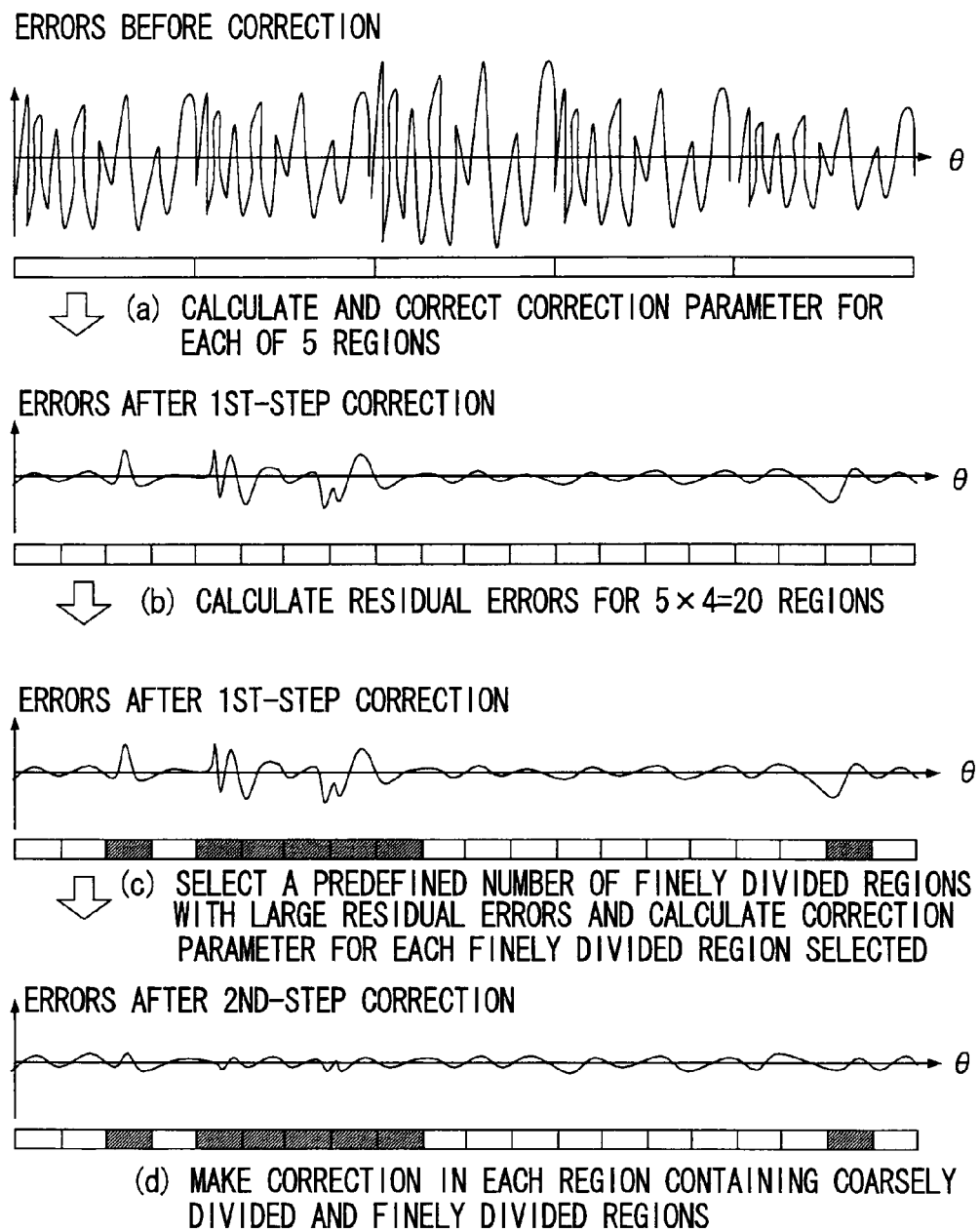
FIG. 10 is schematic diagram showing how the detection range is finely divided into the regions in two steps.

The two-step fine region segmentation process is explained below with reference to a flowchart of FIG. 9 and a schematic segmentation scheme of FIG. 10. First, the entire position detection range is coarsely divided into equally spaced regions (e.g., 5 regions as illustrated) as shown in FIG. 10(a) (Step 51). Shown by a waveform of FIG. 10(a) are short-period errors in the individual coarsely divided regions that are referred to as pre-correction errors, which are obtained by calculating a long-period correction parameter based on position detection errors extracted at intervals of the coarsely divided regions by equation (4) mentioned earlier and further calculating position detection errors by using this long-period correction parameter by equation (5) mentioned earlier.

Next, a short-period correction parameter is calculated from data for each of the coarsely divided regions (Step 52). Then, the entire position detection range is once finely divided into equally spaced regions (e.g., 5×4=20 regions in total by further dividing each coarsely divided region into four regions as illustrated) as shown in FIG. 10(b) (Step 53).

Next, residual errors left after correcting the detected position values are calculated by using the short-period correction parameter calculated in Step 52 (Step 54). Shown by a waveform of FIG. 10(b) are these residual errors.

Subsequently, the aforementioned residual errors are evaluated for individual finely divided regions, maximum residual errors in the individual finely divided regions are calculated (Step 55), and the maximum residual errors are sorted according to their magnitude (Step 56). Next, a predefined number (which is set according to the memory capacity; 6 in this example) of sorted finely divided regions in descending order of the maximum residual errors are selected as shown in FIG. 10(c) (Step 57). If the entirety of any coarsely divided region is subdivided into small regions like the second coarsely divided region from left of FIG. 10(c) (Yes in Step 58), however, finely divided regions as many as the number of lost coarsely divided regions are additionally selected (Step 59).

Specifically, if all of the original coarsely divided regions are subdivided into small regions, errors in the original coarsely divided regions are newly calculated for all of the small regions and data required for the original coarsely divided regions become unnecessary. In this case, it becomes possible to overwrite the data in memory locations reserved for data storage for the original coarsely divided regions so that the number of subdividable coarsely divided regions is increased by 1 to 7.

Finally, a short-period correction parameter is newly calculated for each of the selected finely divided regions whereas the short-period correction parameter calculated for each of the coarsely divided regions before subdividing is employed for each of the nonselected finely divided regions, and the individual values of the correction parameter are stored in the nonvolatile memory (Step 60).

Shown by a waveform of FIG. 10(d) are the residual errors left after correcting the detected position values by using the individual values of the correction parameter calculated in Step 60.

Since only such regions where large errors occur are subdivided into small regions and short-period error correction values are prepared for the subdivided regions in the second embodiment of the present invention as discussed above, it becomes possible to correct errors with high accuracy by using the nonvolatile memory having a limited capacity. It also becomes possible to correct errors with high accuracy even when locally large errors exist at a plurality of parts in the entire position detection range.

Third Embodiment

While the periodic function G(θ) which is a power function of the detected positions θ is expressed by a linear function of θ in the foregoing embodiments, the following discussion introduces variations thereof.

Figure 11:
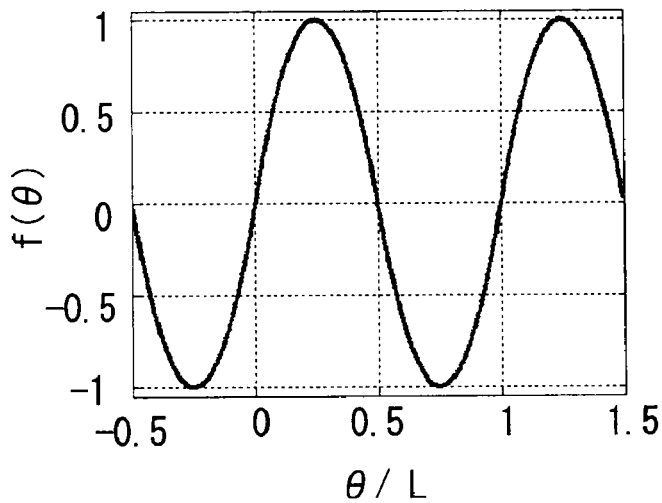
FIG. 11 is a graph depicting a periodic function G(θ) expressed by a quadratic function of detected positions θ.

Specifically, it is possible to use a quadratic function shown in equation (16) as a periodic function which allows simple calculation for approximating errors instead of the sawtooth wave function of equation (2). Here, the periodic function is expressed as f(θ) wherein L represents a fundamental period of position detection and θm represents a remainder left when a detected position value θ is divided by L. Shown in FIG. 11 is a graph depicting a relationship between detected position values θ and the function f(θ).

[Mathematical Expression 17]

$$f(\theta m) = \begin{cases} -16\left\{\left(\dfrac{\theta_m}{L}\right) - \dfrac{1}{4}\right\}^2 + 1 & \left(\theta_m \leq \dfrac{L}{2}\right) \\ 16\left\{\left(\dfrac{\theta_m}{L}\right) - \dfrac{3}{4}\right\}^2 - 1 & \left(\dfrac{L}{2} < \theta_m\right) \end{cases} \quad (Eq.\ 16)$$

Since the calculation can be performed by simple branch processing and product-sum operation in this case as well, it is possible to start up the position detection error correcting apparatus in a short time. As this approach does not consume the random access memory, it becomes possible to correct errors with high accuracy by preparing finely determined position detection error correction values to a corresponding extent.

Fourth Embodiment

Figure 12:
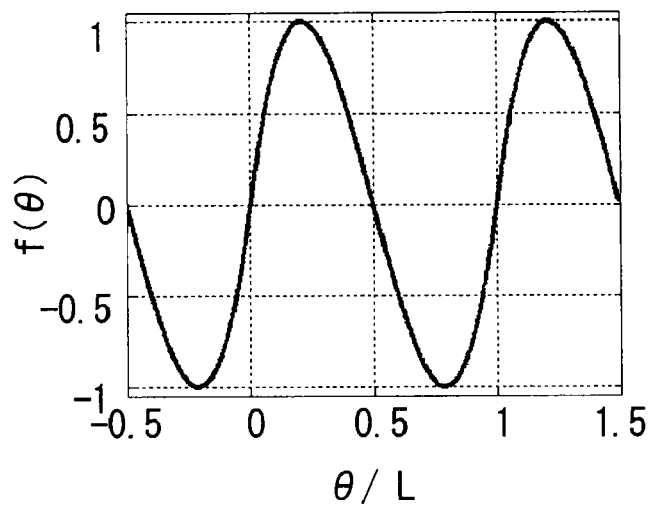
FIG. 12 is a graph depicting a periodic function G(θ) expressed by a cubic function of detected positions θ.

Likewise, equation (17) is a cubic function of θ used as a periodic function. Shown in FIG. 12 is a graph depicting a relationship between detected position values θ and the function f(θ).

[Mathematical Expression 18]

$$f(\theta m) = 12\sqrt{3}\left\{\left(\dfrac{\theta_m}{L}\right)^3 - \dfrac{3}{2}\left(\dfrac{\theta_m}{L}\right)^2 + \dfrac{\theta_m}{2L}\right\} \quad (Eq.\ 17)$$

Since the calculation can be performed by a simple product-sum operation in this case as well, it is possible to start up the position detection error correcting apparatus in a short time. As this approach does not consume the random access memory, it becomes possible to correct errors with high accuracy by preparing finely determined position detection error correction values to a corresponding extent.

Fifth Embodiment

Figure 13:
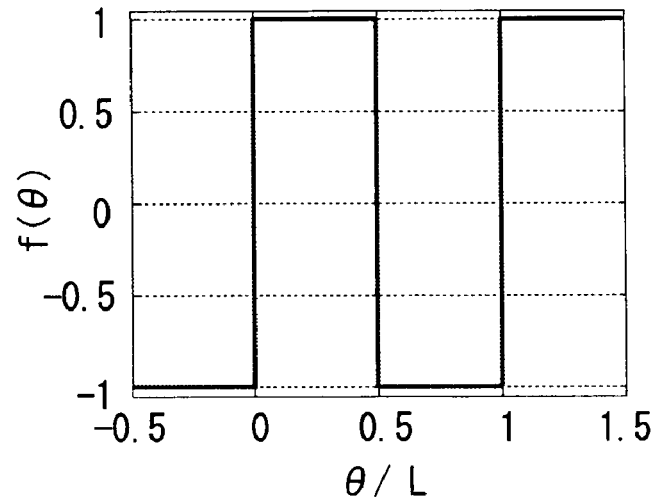
FIG. 13 is a graph depicting a periodic function G(θ) forming a rectangular wave pattern expressed by a zero-order function of detected positions θ.

Equation (18) shows as a different variation an approach using a zero-order function of θ which forms a rectangular wave pattern. Shown in FIG. 13 is a graph depicting a relationship between detected position values θ and the function f(θ).

[Mathematical Expression 19]

$$f(\theta m) = \begin{cases} 1 & \left(\theta_m \leq \dfrac{L}{2}\right) \\ -1 & \left(\dfrac{L}{2} < \theta_m\right) \end{cases} \quad (Eq.\ 18)$$

Since the calculation can be performed by a simple branch processing in this case as well, it is possible to start up the position detection error correcting apparatus in a short time. As this approach does not consume the random access memory, it becomes possible to correct errors with high accuracy by preparing finely determined position detection error correction values to a corresponding extent.

In each variation of the present invention, a position detection range of one rotation is regarded as a fundamental period L if the position detector is of a type for detecting rotational positions whereas an entire position detecting range is regarded as the fundamental period L if the position detector is of a type for detecting linear positions, and a remainder θm left when θ is divided by L is used as equivalent to the detected position θ expressed by the correction function C(θ), so that the error correction values can be calculated in a standardized fashion.

Also, the position detector includes a detection element having the fundamental period L and a detection element having a short period L1 equal to the fundamental period L multiplied by 1/(power of 2), and the position detection error correcting method is a method for calculating the correction parameter based on position detection error data which is a difference between each detected position value given by the position detector and a true position value corresponding thereto, the method including a fourth step of dividing the fundamental period L into a plurality of regions having a relatively long period and calculating a long-period correction parameter based on the position detection error data extracted at intervals of the long period, a fifth step of calculating the correction functions for the entire fundamental period L by using the long-period correction parameter, a sixth step of calculating short-period errors in the individual regions from the correction functions calculated in the fifth step and the position detection error data, and a seventh step of calculating a short-period correction parameter for the short-period error in each of the regions calculated in the sixth step using a remainder θm1 left when θ is divided by the short period L1 as equivalent to the detected position θ expressed by the correction function C(θ), wherein the correction function is calculated by using the long-period correction parameter and the short-period correction parameter. Accordingly, it becomes possible to correct the errors with high accuracy in a short time by using the limited capacity of the storage means.

Also, the position detection error correcting method includes calculating maximum values of the short-period errors calculated in the sixth step in the individual regions as well as an average value of the maximum values in the individual regions throughout the entire range, returning to the fourth step when (maximum value)/(average value) exceeds a specified value, redividing the regions in such a manner that the regions become relatively small in a portion where the maximum value in each region is large and the regions become relatively large in a portion where the maximum value in each region is small, reexecuting the fifth and sixth steps, and further executing the seventh step. Accordingly, it becomes possible to correct the errors with high accuracy in a rational way by using the limited capacity of the storage means even when there exists a portion where large errors occur in part of the detection range.

Also, the position detection error correcting method includes an eighth step of calculating residual errors left after correcting the detected position values by using the short-period correction parameter calculated in the seventh step, and a ninth step of sorting maximum values of the residual errors for individual finely divided regions defined by subdividing the individual regions defined by segmentation in the fourth step according to the magnitude of the maximum values and selecting a specified number of finely divided regions sorted in descending order of the magnitude of the maximum values, wherein the short-period correction parameter calculated for each of the selected finely divided regions by executing the seventh step is employed for each of the selected finely divided regions, whereas the short-period correction parameter calculated for each of the regions defined before segmentation in the ninth step is employed for each of the nonselected finely divided regions.

Accordingly, it becomes possible to correct the errors with high accuracy in a rational way by using the limited capacity of the storage means even when there exists a portion where large errors occur in part of the detection range.

Also, a nonvolatile memory is used as the first storage means and a random access memory is used as the second storage means, so that it is possible to realize a highly economical error correcting apparatus in which the capacity of the generally expensive nonvolatile memory is minimized.

The invention claimed is:

1. A position detection error correcting method comprising:
   a first step of storing beforehand in a first storage means a correction parameter set specifying one of a plurality of correction functions each of which express detection error correction values of a position detector, the correction functions corresponding to a series of periodic functions;
   a second step of reading out said correction parameter set from said first storage means, calculating the detection error correction values corresponding to detected positions and storing the calculated detection error correction values in a second storage means; and
   a third step of reading out the detection error correction values corresponding to detected position values output from said position detector from said second storage means and calculating corrected detected position values corrected for errors in said detected positions;
   wherein, expressing said detected positions by θ, said correction function C(θ) is expressed by equation (1) below in which a periodic function G(θ) is a power function of θ:

[Mathematical Expression 1]

$$C(\theta) = \sum_n \{A_n \cdot G(n\theta + B_n)\} + D \qquad \text{(Eq. 1)}$$

where
   n: order
   An: amplitude component of the correction parameter set;
   Bn: phase component of the correction parameter set; and
   D: offset of the correction parameter set.

2. The position detection error correcting method as recited in claim 1, wherein a nonvolatile memory is used as said first storage means and a random access memory is used as said second storage means.

3. The position detection error correcting method as recited in claim 1, wherein a position detection range of one rotation is regarded as a fundamental period L if said position detector is of a type for detecting rotational positions whereas an entire position detecting range is regarded as the fundamental period L if said position detector is of a type for detecting linear positions, and a remainder θm left when θ is divided by L is used as equivalent to the detected position θ expressed by said correction function C(θ).

4. The position detection error correcting method as recited in claim 3, wherein said position detector includes a detection element having said fundamental period L and a detection element having a short period L1 equal to said fundamental period L multiplied by 1/(power of 2), and said position detection error correcting method is a method for calculating said correction parameter set based on position detection error data which is a difference between each detected position value given by said position detector and a true position value corresponding thereto, said method comprising:
   a fourth step of dividing said fundamental period L into a plurality of regions having a relatively long period and calculating a long-period correction parameter set based on said position detection error data extracted at intervals of said long period;
   a fifth step of calculating the correction functions for said entire fundamental period L by using said long-period correction parameter set;
   a sixth step of calculating short-period errors in said individual regions from the correction functions calculated in said fifth step and said position detection error data; and
   a seventh step of calculating a short-period correction parameter set for the short-period error in each of said regions calculated in said sixth step using a remainder θm1 left when θ is divided by said short period L1 as equivalent to the detected position θ expressed by said correction function C(θ);
   wherein said correction function is calculated by using said long-period correction parameter set and said short-period correction parameter set.

5. The position detection error correcting method as recited in claim 4, further comprising:
   calculating maximum values of the short-period errors calculated in said sixth step in the individual regions as well as an average value of the maximum values in said individual regions throughout the entire range;
   returning to said fourth step when (said maximum value)/(said average value) exceeds a specified value;
   redividing said regions in such a manner that said regions become relatively small in a portion where said maximum value in each region is large and said regions become relatively large in a portion where said maximum value in each region is small;
   reexecuting said fifth and sixth steps; and
   further executing said seventh step.

6. The position detection error correcting method as recited in claim 4, further comprising:
   an eighth step of calculating residual errors left after correcting the detected position values by using the short-period correction parameter set calculated in said seventh step; and
   a ninth step of sorting maximum values of said residual errors for individual finely divided regions defined by subdividing the individual regions defined by segmentation in said fourth step according to the magnitude of the maximum values and selecting a specified number of finely divided regions sorted in descending order of the magnitude of the maximum values;
   wherein the short-period correction parameter set calculated for each of said selected finely divided regions by executing said seventh step is employed for each of said selected finely divided regions, whereas the short-period correction parameter set calculated for each of the regions defined before segmentation in said ninth step is employed for each of the nonselected finely divided regions.

* * * * *